Jan. 12, 1965

R. E. POTTHOFF ETAL 3,164,991

LIQUID LEVEL INDICATOR

Filed Feb. 5, 1963

INVENTORS
Robert E. Potthoff
John F. Wilson
BY

Attorney

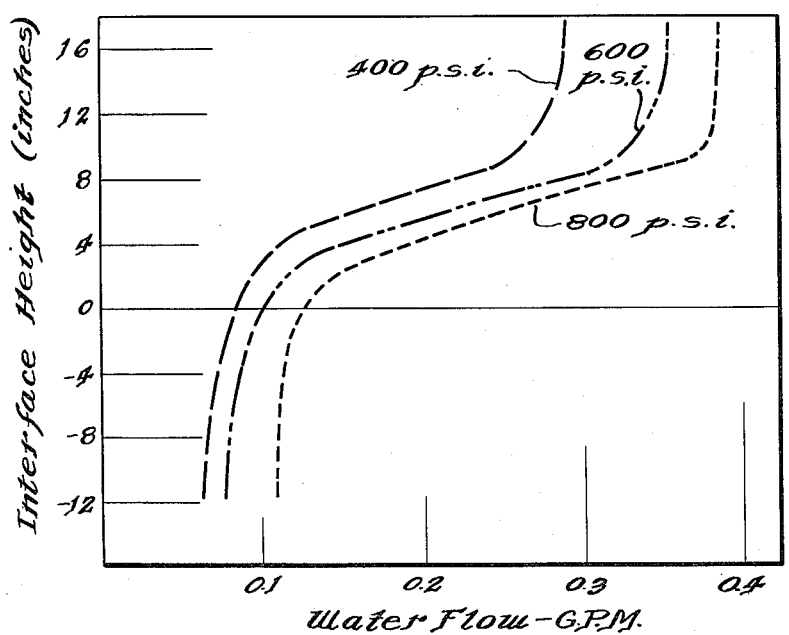

3,164,991
LIQUID LEVEL INDICATOR
Robert E. Potthoff, Stanford, Calif., and John F. Wilson, New Berlin, Wis., assignors, by mesne assignments, to the United States of America as represented by the United States Atomic Energy Commission
Filed Feb. 5, 1963, Ser. No. 256,482
4 Claims. (Cl. 73—297)

This invention relates to a device for locating the level of an interface between liquid and vapor in an apparatus such as a boiling-water reactor or other steam generator, employed to convert the liquid to a vapor.

Conventional level indicators that rely on measuring head or density differences are inaccurate when used on fluids of varying densities as might be encountered in boiling-water reactors or flash tanks.

The novel device of the present invention locates interface positions directly by measuring the flow rate through a small orifice located in the pressure vessel where the steam is generated.

In the drawing:

FIG. 4 illustrates graphs of test results of the present device.

Figure 1:
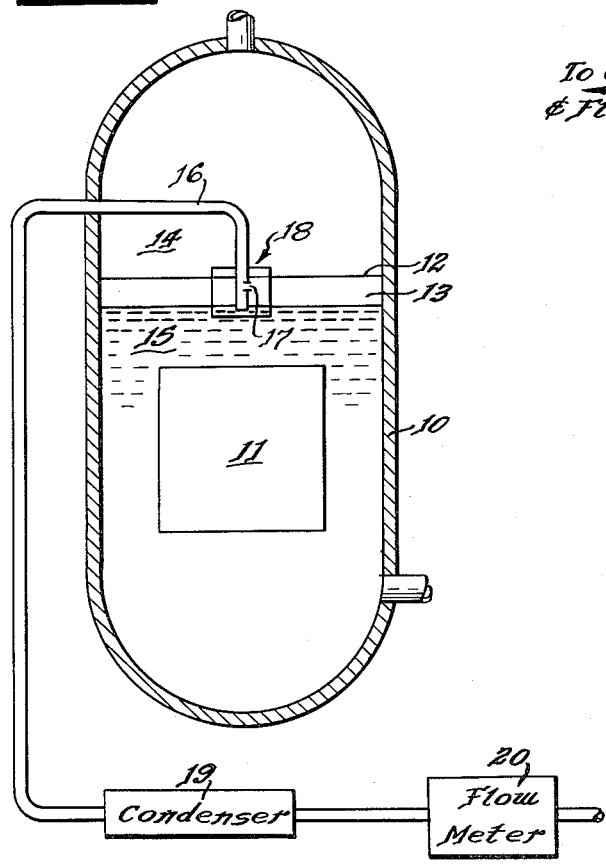
FIG. 1 is a schematic view illustrating the application of the interface-locating device of the present invention to a boiling-water reactor.

As shown in FIG. 1, a pressure vessel 10 contains a core 11 of a nuclear reactor which generates steam from water passing through the core. The reference character 12 designates an interface between the steam and water in the pressure vessel 10, or more particularly, the top of a two-phase region 13 of some depth formed of a mixture of steam and water, between a steam mass 14 and a water mass 15, which are, respectively, above and below the region 13. The novel device of the present invention is to locate the interface 12 or two-phase region 13.

Such a device comprises a closed probe tube 16 having a side orifice 17, a filter-shield assembly 18 enclosing the portion of the tube 16 where the orifice is, a condenser 19, and a flow meter 20. The liquid flow measured by the meter 20 is equal to the sum of whatever steam and/or whatever water is flowing through the orifice. When the two-phase region 13 is at the orifice 17, both steam and water flow therethrough. When the region 13 is distinctly above orifice 17, substantially only water flows through the orifice. When the region 13 is distinctly below orifice 17, substantially only steam flows through the orifice.

Now the flow of steam or water through the orifice 17 is expressed by the equation $Q = \rho V A$, where $\rho$ is the density, $V$ the velocity of the steam or water, and $A$ the cross-sectional area of the orifice. The velocity across the orifice is expressed by the equation $$V = K\sqrt{\frac{2g\Delta P}{\rho}}$$

where $g$ is gravity and $\Delta P$ is the pressure drop across the orifice 17. When the expression for $V$ is substituted in the above equation $Q = \rho V A$, the equation becomes $$Q = KA\sqrt{2g\Delta P\rho}$$

which in effect states the greater the density, the greater the flow through the orifice 17 for a given pressure drop.

It is to be expected that the quantity of water measured by the meter 20 will be appreciably less when the orifice 17 in the probe tube 16 is distinctly above the region 13 in steam mass 14 than when the orifice 17 is distinctly below the region 13, because steam has an appreciably lower density than water. It is also to be expected that when the orifice 17 is at the two-phase region 13 composed of steam and water, an intermediate flow rate will be indicated by the meter 20, which rate is proportional to the extent the orifice 17 lies below the interface 12, because the percentage of water in the two-phase region is likely to be proportional to the distance from the interface 12. These expectations are generally borne out by test results pictured in the graphs of FIG. 4. As this figure shows, tests were carried out at pressures of 400, 600, 800 pounds per square inch. It is to be seen that for each of these pressures there is one relatively constant low flow rate when the orifice 17 is in the steam mass 14 distinctly above the two-phase region 13 and that there is a relatively constant high flow rate when the orifice 17 is in the water mass 15 distinctly below the two-phase region 13. Further, it is to be seen that when the orifice 17 is in the region 13, the flow rate varies generally in accordance with the spacing of the orifice 17 from the top or interface 12 of the region 13.

With appropriate test results such as these reported, the orifice 17 along with the condenser 19 and flowmeter 20 can be used as a locator for the interface 12 or the two-phase region 13. This device also serves to indicate the depth of the two-phase region 13. As will be seen from FIG. 4, the depth of the two-phase region 13 is 10″ or a little more, depending upon the pressure.

The test results were obtained by the use of the probe tube 16 and filter-shield assembly 18 in a suitable steam generator. The tube 16 in these tests had a diameter of 0.25″, the orifice 17 being .04″ in diameter. The assembly 18 in these tests comprised a filter portion 21 formed of a stack of rings 22 spaced .01″ from one another, the rings being 2″ in outer diameter and forming a stack 2″ high. The rings 22 were bonded to rods 23, which are distributed about the interior of the rings. The assembly 18 also comprised shield members 24, which are located at the ends of the stack of rings 22 and welded to the probe tube 16, which extends through the shield members. The stack of rings 22 is fixed to the shields 24. Each shield 24 has a central flat region 25 of 2.25″ diameter and an outer conical region 26 with an outer diameter of 3.75″. The conical portion 26 of each shield 24 was directed so as to extend along one end of the stack rings 22 for a ½″ toward the other shield 24, with the result that there was an opening between the outer edges of the conical portions 26 of 1″. The purpose of the closely spaced rings 22 forming the filter portion 21 was to prevent foreign matter in the water from reaching and clogging the orifice 17. The purpose of the shields 24 was to minimize the possibility of obtaining erroneous readings at the meter 20, due to turbulent conditions at the two-phase region 13.

Figure 3:
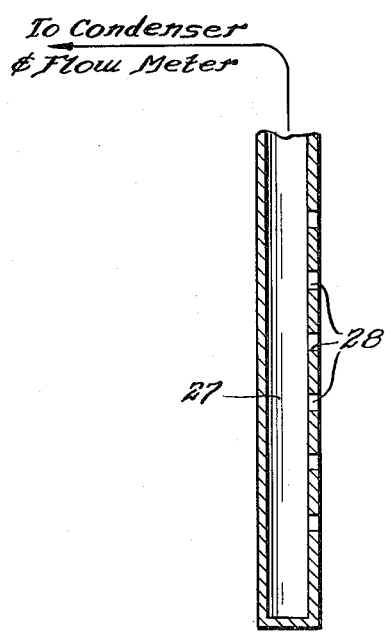
FIG. 3 is a fragmentary sectional view of a modified form of the device of the present invention.
Figure 2:
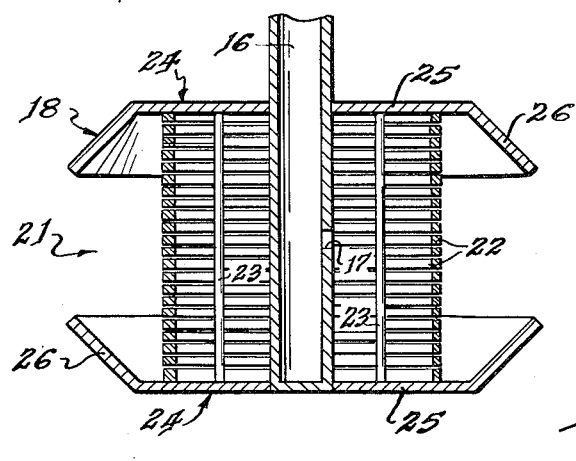
FIG. 2 is a fragmentary sectional view of a probe tube and filter forming part of the present device.

FIG. 3 illustrates an alternate form of probe tube 27 which is provided with a series of orifices 28 spaced along the probe tube. Under certain conditions, the probe tube 27 may permit the meter 20 to have better readings because of a greater total flow of water to the meter coming through the plurality of orifices 28.

It is to be understood that the invention is not to be limited to the details given herein but that it may be modified within the scope of the appended claims.

What is claimed is:

1. A device for determining the location of a two-phase region between a body of liquid and vapor over the liquid in a pressure vessel, said device comprising a generally vertical tube extending in the two-phase region and having a closed end and a side orifice near the closed end, a condenser connected with the other end of the tube, and a flow meter connected with the condenser.

2. The device specified in claim 1, the lower end of the tube being closed and the upper end being connected with the condenser.

3. The device specified in claim 2 and further comprising shields adjacent the orifice in the tube for minimizing the possibility of obtaining erroneous readings at the meter due to turbulence at the two-phase region.

4. The device specified in claim 1, the tube having additional side orifices, the orifice of claim 1 and the said additional orifices being spaced from one another along the tube.

References Cited by the Examiner

UNITED STATES PATENTS

| 401,413 | 4/89 | Clark | 73—298 X |
| 2,377,343 | 6/45 | Holicer | 73—298 |
| 2,725,845 | 12/55 | Johnson | 73—298 X |

FOREIGN PATENTS 732,746   3/43   Germany.

ISAAC LISANN, *Primary Examiner.*